United States Patent
Park

[15] 3,697,121
[45] Oct. 10, 1972

[54] TOWED FOLDING CAMPER HAVING A LOW PROFILE

[72] Inventor: John R. Park, Route 1, Janiper Drive, Elkhar, Ind. 46514

[22] Filed: March 17, 1971

[21] Appl. No.: 125,168

[52] U.S. Cl. ............................. 296/23 R, 296/27, 52/66
[51] Int. Cl. ............................................... B60p 3/32
[58] Field of Search .................... 296/23 R, 27; 52/66

[56] References Cited

UNITED STATES PATENTS 3,514,148    5/1970    Hunter ........................ 296/23

*Primary Examiner*—Philip Goodman
*Attorney*—Oltsch & Knoblock

[57] ABSTRACT

A camper adapted for towing and having a body and a shiftable top. Sliding platforms are carried by the body and are each shiftable in a generally horizontal plane between a retracted position within the body and an extended position outside the body. The platforms are supported upon vertically shiftable tracks and are urged when in their retracted positions downwardly into the body of the vehicle by the top as it spans and encloses the body.

11 Claims, 9 Drawing Figures

PATENTED OCT 10 1972

INVENTOR.
JOHN R. PARK

BY

ATTORNEYS

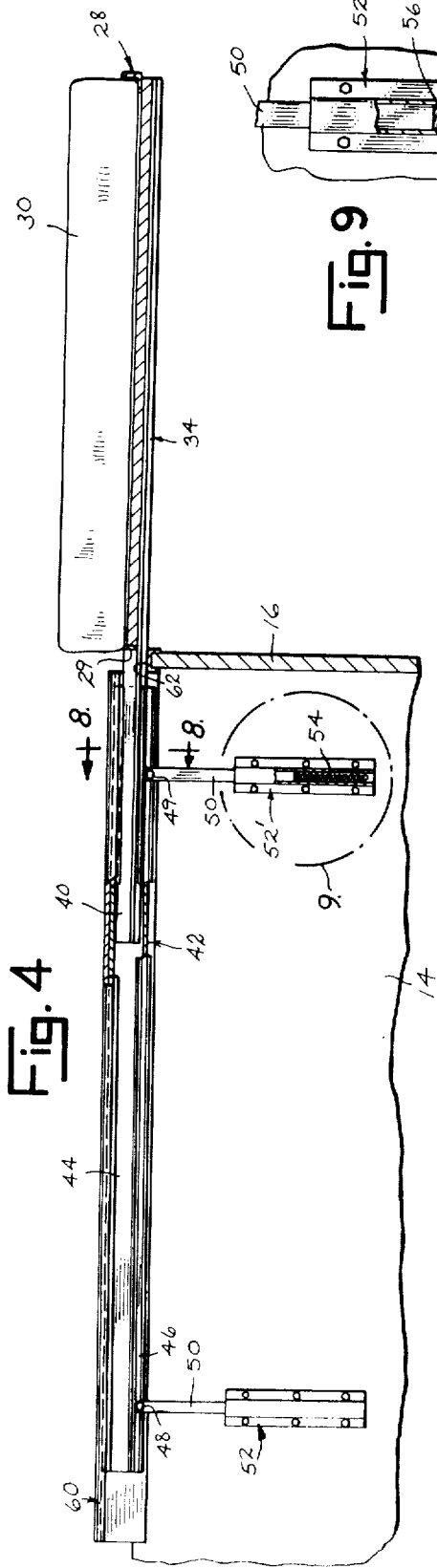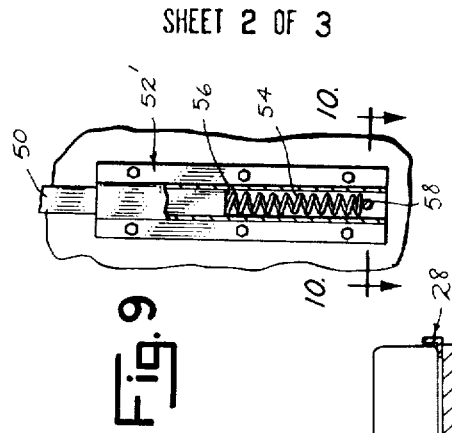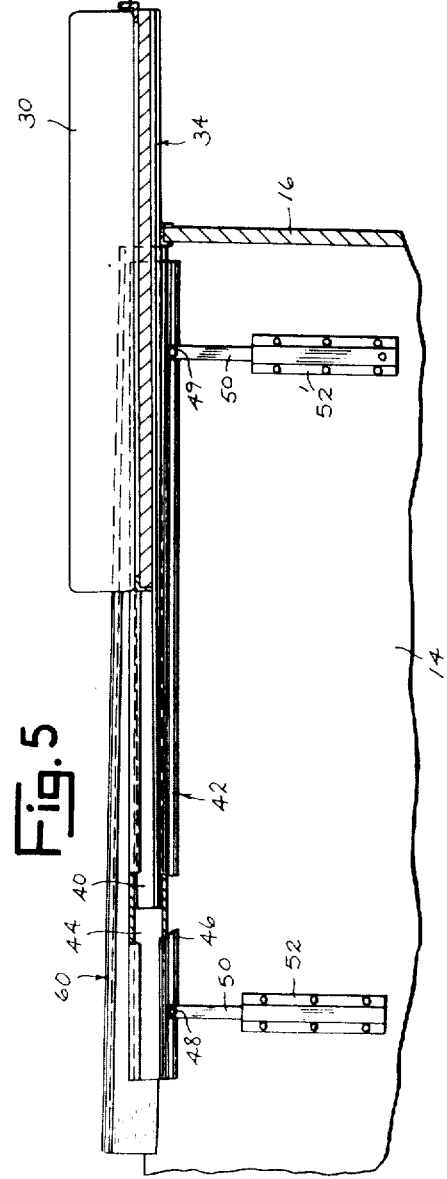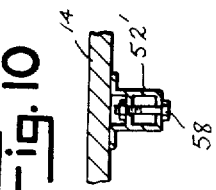

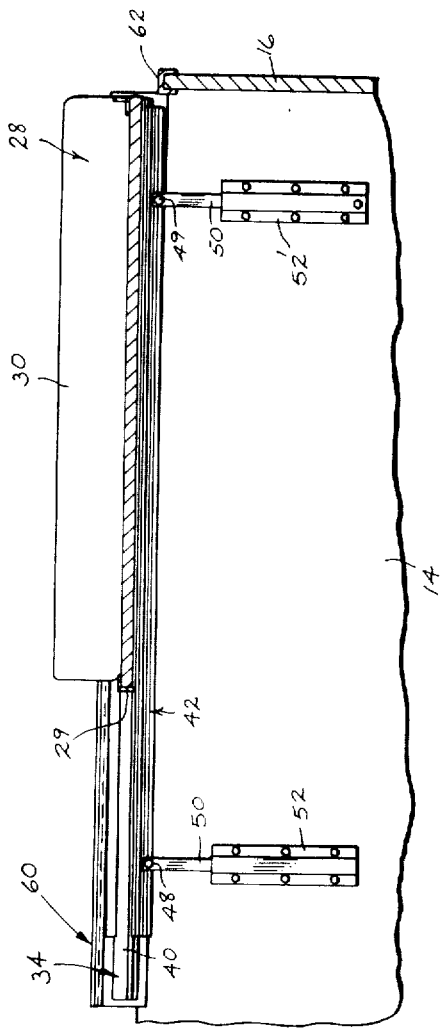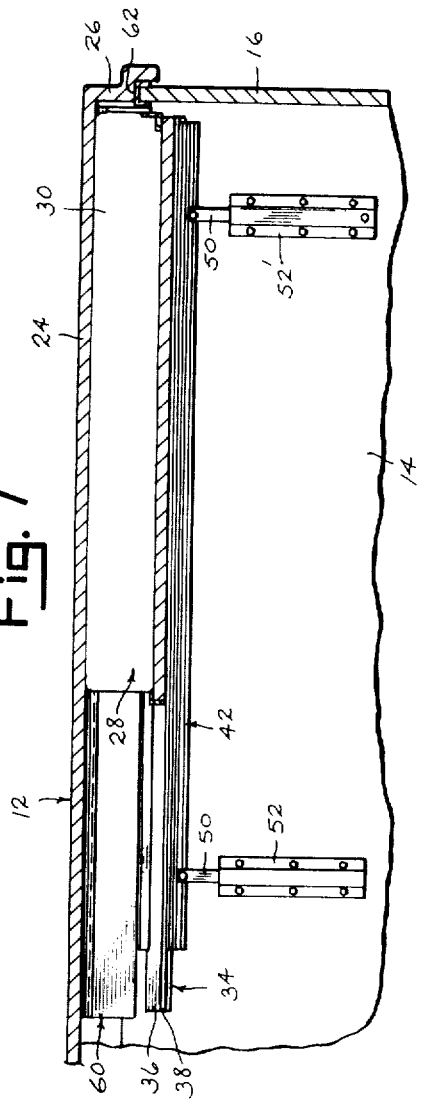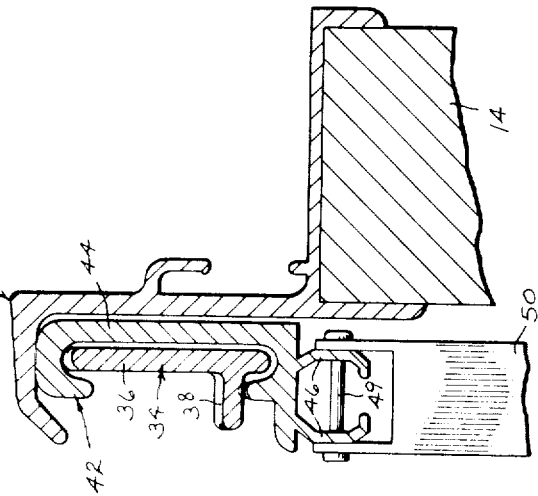

TOWED FOLDING CAMPER HAVING A LOW PROFILE

BACKGROUND OF THE INVENTION

Of the several types of recreational vehicles, the folding camper or camping trailer, as it is sometimes called, is one of the most popular for family use. Campers of this type include coupler means which enables them to be hitched to nearly every type of automobile or truck. Each such camper includes a shiftable top which, when the camper is being towed from one location to another, spans and encloses the camper body. Once a desired destination is reached, the camper can be parked and its top opened so as to render the camper available for use. A disadvantage of the prior art folding camper is that with the top in its closed position and the camper connected to a towing vehicle a part of the rear vision of the driver of the towing vehicle, whether as seen through his rearview mirror or as seen by looking directly out the rear window, as when parking, is blocked.

Also, it is customary to use ten-inch wheels on prior art campers. Such tires, due to their small size, are subject to increased wear and blow-out hazards.

The camper of this invention has a low vertical profile which enables the driver of the towing vehicle to have good rear-view vision. Additionally, 13-inch wheels may be used on the camper of this invention.

SUMMARY OF THE INVENTION

This invention relates to an improvement in recreational vehicles and has particular application to towed campers.

The recreational vehicle of this invention includes a body having side and end walls and a top having a closed position spanning and enclosing the body at the upper margins of the side and end walls. The top is shiftable into an open position so as to expose the interior of the body for use. A pair of tracks are secured to opposite side or end walls by connectors. A platform, which generally includes a bed, is carried by the tracks and is shiftable in a generally horizontal plane between a retracted position located within the vertical planes of the body walls and an extended position located outside of the body. The connectors which secure the tracks to the opposed walls of the body include shiftable parts which enable the tracks and the platform carried thereby to be shifted between upper and lower locations relative to the upper margins of the opposed body walls when the platform is in its retracted position. Biasing means yieldably urges the tracks and the platform carried thereby into their upper location so as to enable the platform to be shifted between its retracted and extended positions. As the top encloses the body at its upper side and end wall margins, it engages the platform which is positioned in its retracted position and urges the tracks and the platform into their lower location.

By having each platform of the above described vehicle designed so as to be depressible within the vehicle body, the top of the vehicle can be designed so as to be positioned more nearly flush with the upper margins of the side and end walls of the body when closed, thus causing the vertical profile of the trailer to be lowered and thereby enabling the driver of the towing vehicle to have improved rear vision when the camper is being towed. Additionally, such campers, by having a lower profile, can be fitted with enlarged wheels and can be stacked to a greater depth upon carriers which serve to transport the campers from manufacturer to dealer and still ensure clearance at road underpasses.

Accordingly, it is an object of this invention to provide a recreational vehicle which is adapted for towing and which has a low vertical profile.

Another object of this invention is to provide a towed camper which has a collapsible top and expandable end or side walls and which has a low vertical profile to minimize obstruction of the rear vision of the driver of the towing vehicle.

Still another object of this invention is to provide a camper having extendable platform members carrying bed means which, when placed in their retracted position, enable the top of the camper to be positioned nearly flush with the upper marginal edges of the side and end walls of the camper, thus lowering the vertical profile of the camper.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 4 is a detail sectional view taken along line 4—4 of FIG. 3.

FIG. 5 is a detail sectional view of the platform mechanism illustrated in FIG. 4 shown in semi-retracted form.

FIG. 6 is a detail sectional view of the platform mechanism of FIG. 4 shown in complete retracted form.

FIG. 7 is a detail sectional view of the platform mechanism of FIG. 4 shown in retracted and lowered form with the top of the camper spanning the upper margins of the camper side and end walls.

FIG. 8 is a detail sectional view taken along line 8—8 of FIG. 4.

FIG. 9 is an enlarged detail sectional view of that portion of the platform mechanism shown encircled in FIG. 4 by line 9.

FIG. 10 is a fragmentary sectional view taken along line 10—10 of FIG. 9.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 2:
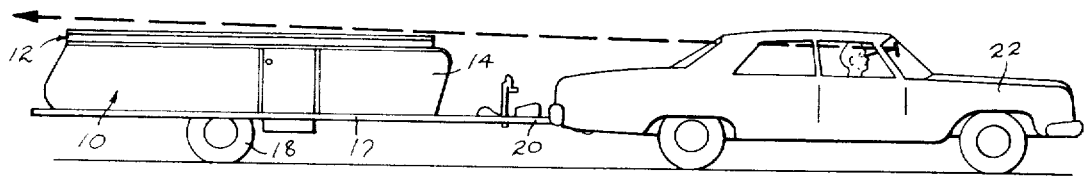
FIG. 2 is a side view of a camper constructed in accordance with the teachings of this invention being towed with the broken directional line indicating the rear vision of the driver of the towing vehicle.
Figure 3:
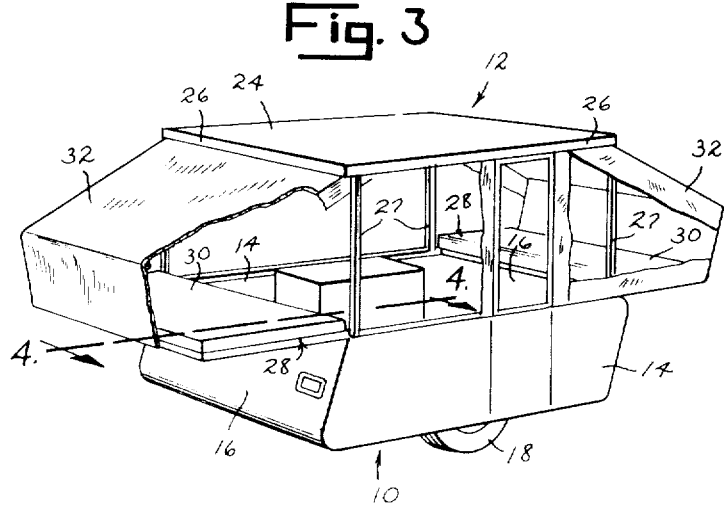
FIG. 3 is a perspective view of the camper shown in FIG. 2 with its top and end wall platforms in extended form.

The embodiment of the recreational vehicle illustrated is known in the trade as a camper having a body 10 and a top 12. Body 10 of the camper includes a floor (not shown), opposed side walls 14 and opposed end walls 16. Body 10 is supported upon a suitable frame 17 which carries a wheel and axle assembly 18 and a hitch coupler 20 by which the camper may be connected to a towing vehicle 22, as shown in FIG. 2. Top 12 of the camper includes a horizontal upper wall portion 24 and depending side and end skirt portions 26. Top 12 is interconnected to body 10 by means of lifts 27 which upon actuation cause the top 12 to shift between its closed position spanning and enclosing body 10 as shown in FIG. 2 and its open position as shown in FIG. 3. A platform 28 which may include a mattress 30 or similar bed means is mounted between opposed side walls 14 adjacent each end wall 16 of the body and is shiftable in a generally horizontal plane between a retracted position located within the planes of the side and end walls of body 10, as illustrated in FIG. 6, and an extended position located outside the body, as illustrated in FIGS. 3 and 4. Canvas or plastic sheeting 32 having suitable areas of screen material incorporated therein extends between top 12, platforms 28, side walls 14 and end walls 16 and serves to enclose the camper when top 12 is in its open position so as to protect the inhabitants of the camper against rain, wind, insects and other natural elements. The camper thus far described is of a general construction in the recreational vehicle art.

Figure 1:
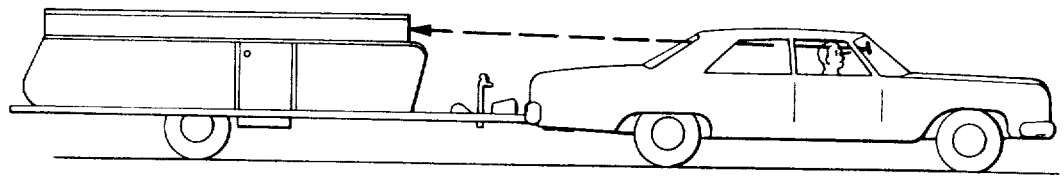
FIG. 1 is a side view of a prior art camper being towed with the broken directional line indicating the rear vision of the driver of the towing vehicle.

This invention has specific application to a means of connecting platforms 28 to body 10 which enables top 12 of the camper to be mounted nearly flush with the upper margins of the side and end walls of the body, as illustrated in FIG. 2, instead of being mounted in a raised position, as illustrated in the prior art camper shown in FIG. 1, where it would substantially obstruct the rear vision of the driver of the towing vehicle. Each platform 28 has an elongated support member 34 suitable secured, such as by screws, along each side edge thereof. While FIGS. 4–8 are illustrative of the platform-to-body connecting means at one side of the camper, it is to be understood that an identical means is utilized to connect each platform to the body at the other side of the camer. Each support member 34 preferably is of uniform cross section and includes a side piece 36 and a flange 38 projecting laterally outwardly from piece 36 adjacently above the lower edge thereof as best seen in FIG. 8. Each side edge of platform 28 abuts piece 36 with the lower marginal face of the platform resting upon flange 38. Each support member 34 is slidably retained within a track member 42 and includes an end portion 40 which projects beyond the inner end edge 29 of its platform. Each track member 42 is positioned along the upper margin of a side wall 14 of body 10 and includes a part 44 which is C-shaped in cross section and within which a support member 34 is slidably retained, as best shown in FIG. 8. Each track member 42 includes flanges 46 which depend from track part 44 and which are pivotally connected by suitable pins 48 and 49 to the upper ends of a pair of upright connectors members 50 positioned at opposite spaced end portions of the track member. The opposite ends of upright members 50 are slidably disposed within connector brackets 52 and 52' which are secured to the inner face of the adjacent side wall 14 of body 10. A helical spring 54 is positioned within connector bracket 52' which is located adjacent an end wall 16. One end of spring 54 abuts the lower end face 56 of the upright member slidably disposed within bracket 52' and the opposite end of the spring abuts a bolt 58 secured to the bracket at the lower edge thereof. The other upright member 50 at each side of the camper preferably has a free sliding fit in its associated bracket 52 although in some constructions of this invention it too may be spring biased. Each helical spring 54 serves to urge its associated track member 42 upwardly where the track member contacts an elongated stop 60 carried at the upper edge of the adjacent side wall 14. Each track member 42 is shiftable between an upper position, such as that shown in FIG. 6, limited by its engagement with stop member 60 wherein the support member 34 and platform 28 carried by the track member are positioned adjacently above the upper edge 62 of the adjacent body end wall 16 and a lower position, such as that shown in FIG. 7, wherein the support member 34 is positioned below edge 62 of the end wall.

To explain the operation of the subject invention, it will be assumed that the camper with its top 12 in its closed position has been suitably parked. Platforms 28 may be located within camper body 10 in their lower position with mattresses 30 abutting the inner face of upper wall portion 24 of the top, as shown in FIG. 7. Actuation of lifts 27 causes top 12 to be raised to its open position as shown in FIG. 3. As top 12 is being raised, helical springs 54 in connector brackets 52' urge track members 42 and supported platform 28 upwardly into the general position shown in FIG. 6. The user of the camper then grasps each platform 28 and pulls it outwardly in a generally horizontal plane, causing support members 34 to slide within track members 42, until the platform is positioned in its extended position as shown in FIG. 4. While in its extended position, each platform 28 is supported with its connected support members resting upon the upper edge 62 of the adjacent end wall 16 and its end portion 40 abutting stop 60 which is securely anchored to its side wall 14.

When it is desired to lower top 12 in preparation for moving the camper, each platform 28 may be pushed inwardly into its retracted position as shown in FIG. 6. To facilitate retraction of the platforms, it is preferable to have track members 42 assume the inclined orientation seen in FIG. 5 as the platforms are being pushed into the body 10. This inclination of the track members creates a "down-hill" assist when retracting the platforms and can be occasioned by providing pins 48 with a slotted free fit within flanges 46 of the track members. To provide strength and accommodate sliding of the support members 34 within track part 44 without the need of rollers, the track members are preferably formed of anodized aluminum and the support members are preferably formed of steel. With each platform 28 retracted as shown in FIG. 6, the top 12 may then be lowered with upper wall portion 24 thereof engaging mattress 30 and causing each platform 28, support members 34 and track members 42 to be urged downwardly into the general position shown in FIG. 7. The top may then be suitably latched or fastened to body 10.

It is to be understood that stop 60 need not extend above the upper edges of side walls 14 but instead may be associated in a variety of constructions with track members 42 or connector members 50 so as to enable the track members 42, support members 34, and stops to be positionable below the level of the upper edges of the side and end walls and thus enable the top of the camper to be mounted flush with body 10. Further, it is contemplated that the platforms and associated track and support members of this invention would be incorporable into an actuating system for a camper, such as that shown in U. S. Pat. No. 3,397,007, in which the platforms are automatically extended as the top of the camper is raised. It is also to be understood that support members 34 could include rollers which traverse track members 42.

This invention is not to be limited to the details herein given but may be modified within the scope of the appended claims.

What I claim is:

1. In a recreational vehicle which includes a body having side and end walls and a top having a closed position spanning and enclosing said body at the upper margins of said side and end walls, said top being shiftable into an open position to expose the interior of said body for use, a pair of tracks, connectors attaching said tracks to opposed side or end walls, each track being carried by one of said opposed walls and extending adjacent to the upper margin thereof, a platform including a pair of supports, each support being shiftably carried within a said track so as to enable said platform to be shifted in a generally horizontal plane between a retracted position located within the planes of said side and end walls and an extended position located generally outside of said body, the improvement wherein said connectors include shiftable means connecting said tracks to said opposed walls for enabling said platform when in its retracted position and said tracks to be shifted between upper and lower positions relative to the upper margins of said opposed walls, means yieldably biasing said tracks and said platform into said upper position to enable said platform to be shifted between its extended and retracted positions, said top in its closed position engaging said platform in its retracted position and urging said tracks and platform into said lower position.

2. The vehicle of claim 1 wherein said platform includes bed means, said top engaging said bed means when in its closed position.

3. The vehicle of claim 1 wherein said shiftable means includes a pair of spaced depending members each connected at one end to a track, a pair of brackets fixedly anchored to one of said opposed walls, each bracket including guide means, each of said depending members having its other end slidably disposed within a said bracket guide means.

4. The vehicle of claim 3 wherein said biasing means is a spring means carried within at least one bracket guide means and abutting the other depending member end disposed therein, said spring means being placed in compression when said track is in said lower position.

5. The vehicle of claim 3 and a stop carried by said one opposed wall, said track engaging said stop when urged by said biasing means into said upper position.

6. The vehicle of claim 3 wherein each one depending member end is pivotally connected to said track.

7. The vehicle of claim 6 wherein one of the one depending member ends is shiftably connected to said track so as to be movable relative to the track as the track shifts between said upper and lower positions.

8. The vehicle of claim 1 and stop means carried by said body for locating said tracks in said upper position, said supports having corresponding parts intermediate the ends of said supports resting upon one of the other of said opposed walls at the upper edge thereof when said platform is in its extended position.

9. The vehicle of claim 1 and including another said platform having a pair of supports, at least one pair of tracks, each support being shiftably carried within a said track so as to enable each platform to be shifted between its extended and retracted positions.

10. The vehicle of claim 9 wherein said connectors connect said tracks to opposed side walls with said platforms each being shiftable laterally relative to an end wall.

11. The vehicle of claim 4 wherein said shiftable means interconnects said tracks to opposed side walls and said pair of brackets is anchored to one of the side walls, said platform being shiftable over an end wall when shifted between retracted and extended positions, one bracket of said pair of brackets being located nearer to said end wall than the other bracket and carrying said spring means.

* * * * *